United States Patent [19]

Van Rosmalen

[11] Patent Number: 5,524,004
[45] Date of Patent: Jun. 4, 1996

[54] SUSPENSION FOR THE OPTICAL HEAD OF A DISC SCANNER WITH MECHANICAL LIMITING OF OBJECTIVE LENS

[75] Inventor: Gerard E. Van Rosmalen, Eindhoven, Netherlands

[73] Assignee: U.S. Philips Corporation, New York, N.Y.

[21] Appl. No.: 210,961

[22] Filed: Mar. 21, 1994

[30] Foreign Application Priority Data

Apr. 2, 1993 [EP] European Pat. Off. ............. 93200975

[51] Int. Cl.⁶ ........................... G11B 21/02; G11B 7/095
[52] U.S. Cl. .......................... 369/215; 359/814; 359/824; 369/44.14; 369/44.16
[58] Field of Search .......................... 369/44.14–44.16, 369/215; 359/813–814, 823–824

[56] References Cited

U.S. PATENT DOCUMENTS

| | | | |
|---|---|---|---|
| 4,794,580 | 12/1988 | Ikedo et al. ........................ | 369/44.16 |
| 5,056,891 | 10/1991 | Masunaga ........................ | 369/44.15 X |
| 5,073,883 | 12/1991 | Mitsumori .......................... | 369/44.15 |
| 5,199,014 | 3/1993 | Homburg et al. ................... | 369/44.15 |
| 5,323,369 | 6/1994 | Kim .................................... | 369/44.15 |
| 5,351,225 | 9/1994 | Ishida et al. ...................... | 369/44.15 X |

FOREIGN PATENT DOCUMENTS

| | | |
|---|---|---|
| 0458027 | 11/1991 | European Pat. Off. . |
| 0464912 | 1/1992 | European Pat. Off. . |
| 3315848 | 5/1988 | Germany . |

*Primary Examiner*—W. R. Young

[57] ABSTRACT

A scanning device carried on a slide has a section which is movable relative to the slide in the direction of slide movement and in a focusing direction transverse to that direction. An actuator controls both directions of relative movement during normal scanning. To permit free movement in the focusing direction without friction during periods of high acceleration or deceleration of the slide, a mechanical stop limits the relative movement in the direction of slide movement. To prevent friction from impeding focusing movement, the stop is compliant in the focusing direction.

9 Claims, 4 Drawing Sheets

5,524,004

SUSPENSION FOR THE OPTICAL HEAD OF A DISC SCANNER WITH MECHANICAL LIMITING OF OBJECTIVE LENS

BACKGROUND OF THE INVENTION

The invention relates to an apparatus for recording and/or reading information by means of a radiation beam, which apparatus comprises a frame, a turntable for supporting a disc-shaped information carrier, which turntable is rotatable about an axis of rotation, a slide which is movable in an at least substantially radial direction relative to said axis of rotation, and a scanning device carried on the slide. The scanning device includes a first section secured to the slide, a second section which is movable relative to said first section and which includes an objective lens having an optical axis extending at least substantially parallel to the axis of rotation, and actuator means for moving the second section including the lens in a radial direction and along the optical axis in a focusing direction transverse to said radial direction.

The invention further relates to a scanning device suitable for use in an apparatus of the type defined in the opening paragraph. The scanning device comprises a first section, a second section which is movable relative to said first section and which includes a lens having an optical axis, and actuator means for moving the second section including the lens along a first axis transverse to the optical axis and a along a second axis which coincides with the optical axis.

An apparatus for scanning a disc-shaped information carrier by means of a radiation beam and an electro-optical scanning device used in such an apparatus are known from EP-A 0,464,912 (to which U.S. Pat. No. 5,199,014 corresponds, herewith incorporated by reference. The known scanning device has an objective lens which is movable in a focusing direction, in order to form a radiation spot on a surface to be scanned, and in a tracking direction transverse to the focusing direction, in order to follow a recording track. For this purpose the scanning device comprises a stationary section having a magnetic circuit with an air gap, a section which is movable relative to the stationary section and carries said lens, and coils for driving the movable section with the lens. The movable section is secured to the stationary section by flexible mechanical suspension means.

The known scanning device is used in an optical player, which also comprises a turntable and a slide. The slide, which carries the scanning device, is movable relative to the turntable along a radial path, which radial path extends in said tracking direction.

Such a player is suitable inter alia for reading disc-shaped optical information carriers carrying information in a plurality of concentric tracks or quasiconcentric tracks together forming a spiral information track. When the information carrier is rotated by means of the turntable it is possible to scan a single track in the information carrier. To scan the other tracks the objective lens should be moved over the tracks in a radial direction. A short access time to the stored information requires a rapid movement of the objective lens over the tracks. This can be achieved by a jumplike movement of the slide over a radial distance. Since this may be attended with substantial accelerations and decelerations the movable section of the scanning device may be pressed against the stationary section. This obstructs movements of the objective lens in the focusing direction during rapid movement of the slide, which may give rise to errors in the track count during a search function.

SUMMARY OF THE INVENTION

It is an object of the invention to provide an apparatus of the type defined in the opening paragraph, by means of which short access times to the information on the information carrier can be realised in a reliable manner.

To this end the apparatus in accordance with the invention is characterized in that the apparatus comprises mechanical limiting means for limiting movements of the movable section in the at least substantially radial direction, which limiting means allow movements of the objective lens in the focusing direction during limiting. During use of the apparatus the scanning device focuses the radiation beam so as to form a radiation spot on an information-carrier track to be scanned. This radiation spot follows the track of the rotating information carrier during recording and/or reading. This is achieved by means of a tracking control system, which provides coarse control of the lens in a radial direction with the slide and fine control in a radial direction with the scanning device. For a movement of the scanning spot between two addresses the slide is moved rapidly, while the limiting means ensures that the movable section can be moved unimpededly in the focusing direction in order to focus the radiation beam. This enables the tracks to be counted accurately during the radial movement of the slide and it guarantees an exact movement of the scanning spot from one track to a remote other track within a short time interval.

An embodiment of the apparatus is characterized in that the limiting means comprise a first limiting element connected to the first section of the scanning device and a second limiting element connected to the second section of the scanning device and adapted to cooperate with said first limiting element, both limiting elements being at least substantially stiff in said radial direction and at least one of said limiting elements being compliant in the focusing direction. This eliminates any frictional contact between the parts which move in the focusing direction and those which do not. In order to miniraise the mass of the movable section of the scanning device the second limiting element is preferably constructed to be as small and as simple as possible, for example as a hook-shaped stop. The other limiting element can then be of a compliant construction.

A practical embodiment of the apparatus in accordance with the invention is characterized in that the limiting element which is compliant in the focusing direction extends in the at least substantially radial direction and comprises an integral hinge having a hinge axis oriented transversely of the radial direction and the focusing direction.

Preferably, the limiting elements are constructed in such a manner that they are not in contact with one another during information recording and reading operations because the limiting elements have no function during these operations. The accelerations produced during a search operation do not occur during recording and/or reading.

The scanning device in accordance with the invention is characterized in that mechanical limiting means have been provided for limiting movements of the movable section along the first axis, which limiting means allow movements of the movable section along the second axis during limiting. This scanning device is suitable for use in the apparatus in accordance with the invention.

An embodiment of the scanning device in accordance with the invention is characterized in that the limiting means comprise a first limiting element secured to the first section and a second limiting element secured to the second section and adapted to cooperate with said first limiting element, both limiting elements being at least substantially stiff in a direction defined by the first axis, and at least one of said limiting elements being compliant in a direction defined by the second axis.

The invention will be described in more detail, by way of example, with reference to the drawings.

DESCRIPTION OF THE PREFERRED EMBODIMENT

Figure 1:
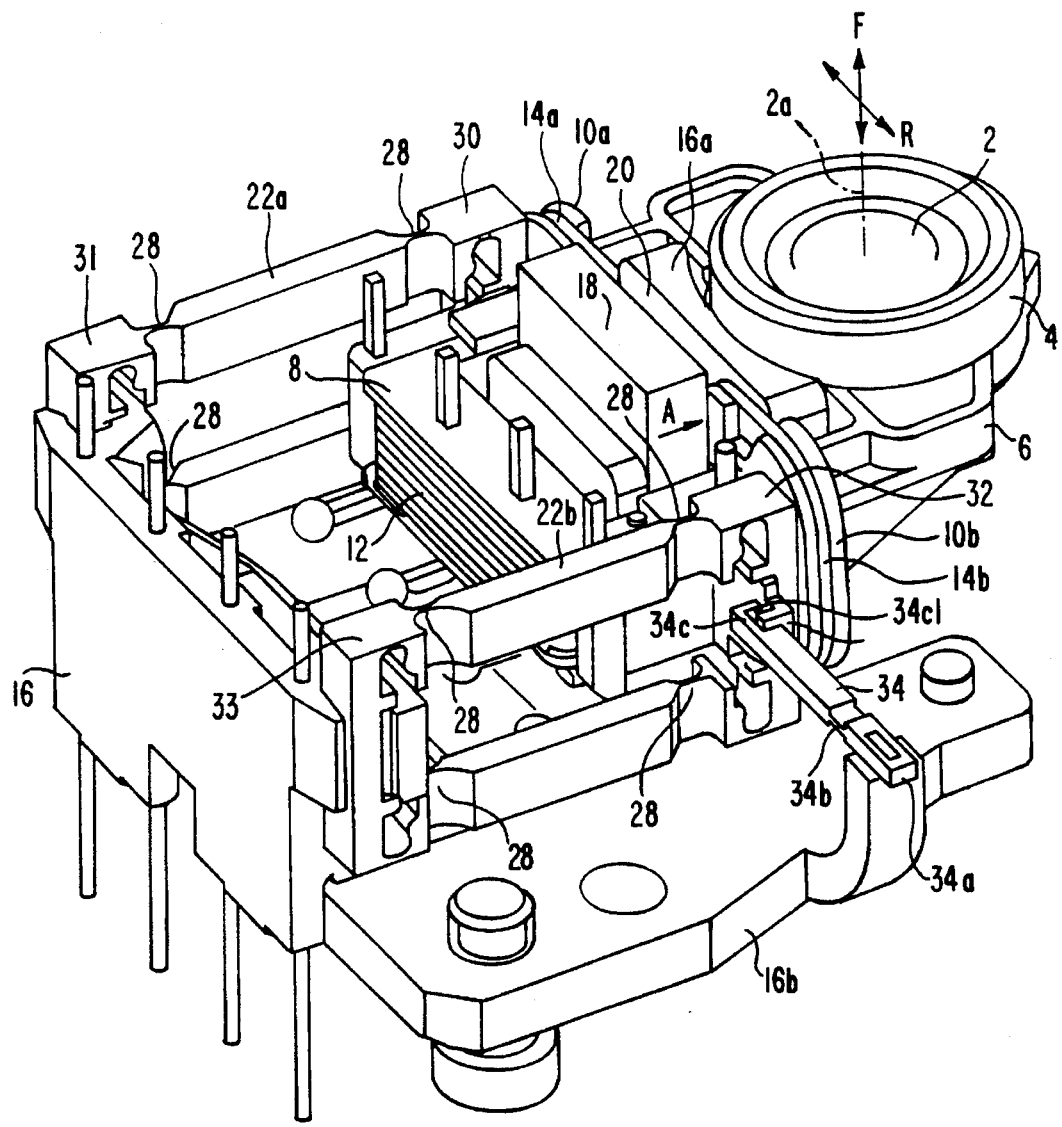
FIG. 1 shows a first embodiment of the scanning unit in accordance with the invention.

The embodiment of the electro-optical scanning device in accordance with the invention shown in FIG. 1 is intended for use in optical players having decks constructed for two-stage radial tracking of optical discs, for example CDs of 8 cm or 12 cm diameter. In such a deck an objective can be translated along a radial path relative to a disc which is rotatable about an axis of rotation. For this purpose the deck preferably comprises a translatable slide carrying the scanning device. An information track of a rotating disc can be inscribed and/or read without mechanical contact by means of a radiation beam transmitted to the scanning device and produced by a laser.

The scanning device comprises an objective lens 2 mounted in a lens holder 4 and having an optical axis 2a. The lens holder 4 forms part of a movable section 6 of the scanning device, the movable section further comprising a focusing-coil holder 8 and two tracking-coil holders 10a and 10b. The coil holders 8, 10a and 10b are interconnected and connected to the lens holder 4. The focusing-coil holder 8 comprises a focusing coil 12 having a coil axis parallel to the optical axis 2a. The tracking-coil holders 10a and 10b each comprise a tracking coil 14a and 14b, respectively.

The scanning device in accordance with the invention further comprises a stationary section 16, which comprises a permanent magnet 18 and ferromagnetic portions. The magnet 18, which has been magnetized in a direction indicated by an arrow A, forms a magnetic circuit with the ferromagnetic portions of the stationary section 16, a magnetic air gap 20 extending between the magnet 18 and one of the ferromagnetic portions 16a. In the present specification the stationary section and the movable section are also referred to as the first section and the second section, respectively. The stationary section 16 further comprises a mounting plate 16b for securing it to a slide.

The second section 6 is movably secured to the first section 16 by means of a flexible suspension or supporting means, the focusing coil 12 and the tracking coils 14a and 14b extending partly in the air gap 20. The second section, in particular the lens 2, is movable relative to the first section in a focusing direction, indicated by a double arrow F, and in a tracking direction, indicated by a double arrow R.

The suspension means comprises two frame-shaped elements 22a and 22b, which are preferably made of a plastics and which each have four integral hinges 28. The lens 2 has a neutral position, in which the elements 22a and 22b extend in a direction oriented transversely of a plane defined by the focusing direction F and the tracking direction T. The elements 22a and 22b are secured to the second section 6 and the first section 16, respectively, by means of connecting portions 30, 32 and connecting portions 31, 33, respectively. The double integral hinges 28 allow both movements about an axis which extends in the focusing direction F and about an axis which extends in the tracking direction R.

As a result of the suspension means used the focusing movements and the tracking movements are translational movements. An advantage of this is that a satisfactory compromise is obtained between the susceptibility to shocks produced outside the slide carrying the scanning device and the susceptibility to disturbances originating from the slide itself.

The scanning device in accordance with the invention comprises mechanical limiting means for limiting the movements of the second section 6 in the tracking direction R. These limiting means comprise a first limiting element 34 secured to the stationary section 16 and a second limiting element 35 secured to the movable section 6 for cooperation with the first limiting element 34. In the present example the first limiting element 34 is constructed as a plastics member which extends in the radial direction R and is stiff in this direction, which element has a fixed end 34a secured to the mounting plate 16b of the first section 16. The element 34 has an integral hinge 34b whose hinge axis extends transversely of a plane defined by the directions F and R, so that the element 34 can deflect in the focusing direction F. The limiting element 34 further has a free end portion 34c with a recess 34c1. In the present example the second limiting element 35 is constructed as a hook-shaped rigid projection extending into the recess 34c1. In the neutral position of the lens 2 both limiting elements 34 and 35 are not in contact with one another. The elements 34 and 35 are neither in contact with one another during small excursions of the lens 2 in the radial direction R. However, large rapid movements of the movable section are limited in that the hook-shaped projection 35 then abuts against one of the parallel bounding walls of the recess 34c1 in the element 34. The dimensioning is such that the movable section 6 cannot be in undesirable contact with the stationary section 16 in a limiting situation or cannot come into undesirable contact with this stationary section during focusing movements. This means that an undisturbed focusing is possible under all normal operating conditions.

Figure 2:
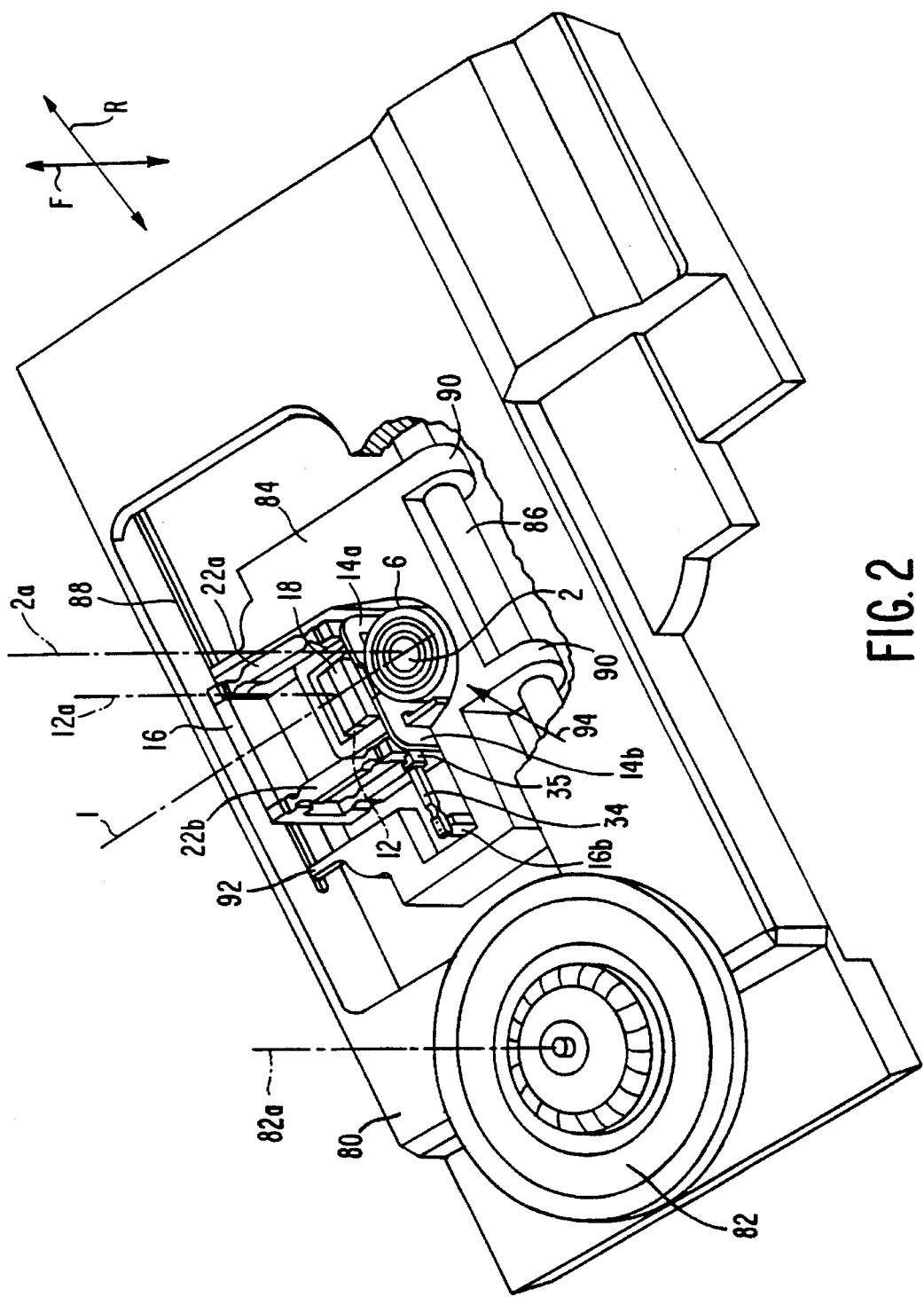
FIG. 2 shows a first embodiment of the apparatus in accordance with the invention.

FIG. 2 shows a pan of an optical player or, in more general terms, an apparatus for recording and/or reading information by means of a radiation beam, employing an embodiment of the device in accordance with the invention. In the description of the present embodiment parts corresponding to those in the embodiment shown in FIG. 1 bear the same reference numerals.

The apparatus shown in FIG. 2 comprises a chassis 80 in which an electrically drivable turntable 82 for supporting and centering a disc-shaped information carrier or optical disc having an information track, for example a CD, is supported so as to be rotatable about an axis of rotation 82a. The apparatus further comprises mechanical guide means for translating a slide 84 radially relative to the turntable 82 (as indicated by the arrow R). The guide means comprise a guide rod 86, which is secured to the chassis 80, and a guide wall 88 for cooperation with sliding bushes 90 and sliding surfaces 92 of the slide 104, respectively. An electric motor, not shown and mounted in the chassis, serves for driving the slide 84, which may be effected by means of a transmission mechanism.

The slide 84 carries the scanning device 94 in accordance with the invention and a semiconductor laser arranged beside the scanning device 94. The scanning device 94 comprises a movable section 6, which comprises an objective 2 having an optical axis 2*a* parallel to the axis of rotation 82*a*, a focusing coil 12 having a coil axis 12*a*, and two tracking coils 14*a*, 14*b*. A suspension 22*a*, 22*b* connects the movable section 6 to a stationary section 16 of the scanning device, which stationary section is connected to the slide 84 and comprises a magnetic circuit with a permanent magnet 18. The scanning device is positioned in such a way relative to the slide 84 that its longitudinal axis 1 is oriented transversely of the plane defined by the axis of rotation 82*a* and the optical axis 2*a*, so that the objective 2 is movable both in the focusing direction F and in the tracking direction R.

In operation the slide 84 is moved along a radial path, indicated by the arrow R, relative to the axis of rotation 82*a* of the turntable 82 for the purpose of coarsely following an information track of the rotating disc. Since the information track may be slightly off-centred on the optical disc which has been clamped onto the turntable and the turntable may also exhibit slight radial deviations, allowance is made for small radial excursions of the information track during rotation. Any deviations which in operation may arise between the position of the scanning spot formed in the disc by the objective and the track portion to be scanned are reduced by means of a radial tracking system including the scanning device 94, in that the objective 2 performs small high-frequency tracking movements in the direction indicated by the arrow R.

The apparatus in accordance with the invention shown in FIG. 2 has a first limiting element 34 secured to the stationary section 16 and a second limiting element 35 secured to the movable section 6. Both limiting elements 34 and 35 are stiff in the radial direction R, whereas the first limiting element can deflect in the focusing direction F. During a search operation the driving force exerted on the slide 20 may be so large that, even when the tracking coils 14*a*, 14*b* are energized, the movable section 6 cannot follow the resulting radial movement of the stationary section 16, in which case the limiting elements 34 and 35 interengage to limit the resulting displacement of the movable section 6 relative to the stationary section 16. In this situation the movable section 6 can be moved unimpededly in the focusing direction F in order to focus the radiation beam because the limiting element 34 can deflect.

The apparatus in accordance with the invention shown in FIG. 3, hereinafter also referred to as optical player, comprises a slide 143 and a frame 145 for guiding the slide 143. The frame 145 supports a turntable 147 which is rotatable about an axis of rotation 147*a*. The turntable 147 may be adapted to support disc-shaped information carriers such as optical discs, for example CDs, and/or magneto-optical discs. The axis of rotation 147*a* of the turntable 147 extends parallel to an axis Z (the Z axis) of a system of orthogonal axes X, Y, Z having an origin O and shown in the drawing. The turntable 147 can be driven by an electric motor mounted in the frame 145. The slide 143 is movable relative to the turntable 147 in radial directions, i.e. parallel to an axis X (the X axis) of the shown system of axes. For this purpose the slide 143 has bearings 102 cooperating with guide rods 104 of the frame 145. The slide 143 is driven by energizing an actuator coil 110 secured to the slide and arranged opposite the magnets 106 and 108. Such a slide drive arrangement is known per se from DE 33 15 848 (PHD 83.039; herewith incorporated by reference). The slide 143 carries a scanning device 100 in accordance with the invention, which is shown in detail in FIG. 4.

Figure 4:
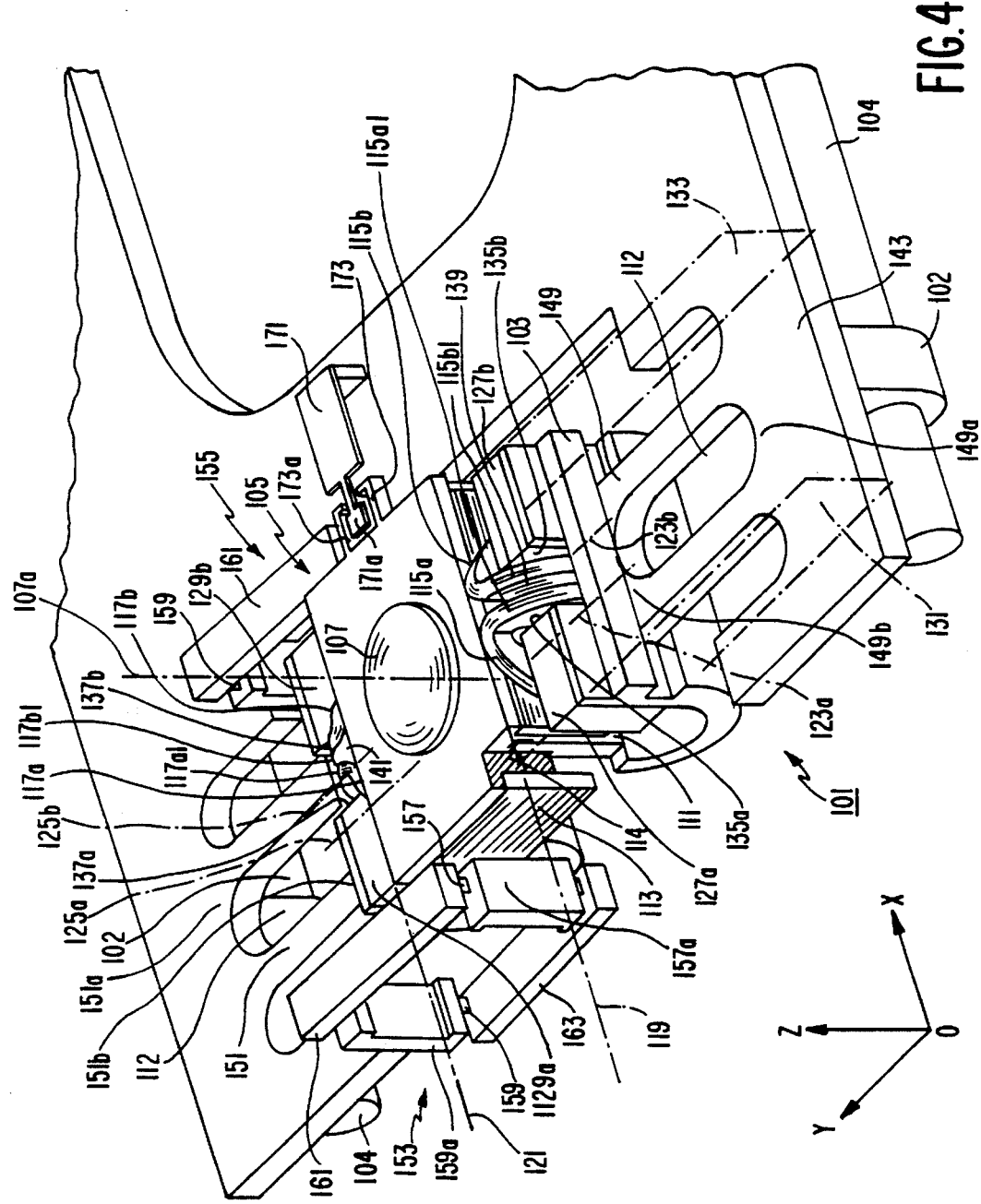
FIG. 4 shows a second embodiment of the scanning device in accordance with the invention.

The scanning device in accordance with the invention shown in FIG. 4 comprises a stationary first section 101 and a second section 105 which is movable relative to this stationary section. The stationary section 101 has a base 103 secured to resilient means of the slide 143. In the present example the base 103 comprises two parts, each part being used as a magnetic yoke and being supported on a free end 149*b* and 151*b*, respectively, of two blade-spring-like supporting elements 149 and 151 of said resilient means. The supporting elements 149 and 151, which have fixed ends 149*a* and 151*a*, respectively, which are integral with the slide 143, are elastic in directions parallel to the Z axis and may each have an opening 112.

The movable section 105 has a central body 114 in which a focusing lens 107 is secured, which lens has an optical axis 107*a* parallel to the Z axis. The second section 105 is movable relative to the first section 101 along the Z axis and the X axis of the shown system of axes. The section 105 is supported relative to the base 103 by means of a suspension comprising two parallel frame-shaped supports 153 and 155 which extend parallel to the Z axis and transversely of the X axis. Each support 153 and 155 comprises two metal or plastics blade springs or blade-spring-like first elements 157 and 159 which extend parallel to the Z axis, which can deflect elastically about an axis parallel to an axis Y (the Y axis) and which can be twisted elastically about an axis parallel to the Z axis. For this purpose the supports 153 and 155 each comprise two stiff elongate plastics second elements 161 and 163 which extend parallel to the Y axis, in which second elements the ends of the elements 157 and 159, which in the present example are metal elements, are embedded. The first elements 157 have plastics central portions 157*a* secured to the movable section 105. The second elements 159 have similar central portions 159*a* which are formed by encapsulation and which are secured to the slide 143.

The scanning device in accordance with the invention is intended for scanning a disc-shaped optically scanned information carrier. Such an information carrier, for example a CD, has an information surface with an information track. Scanning is effected by means of a radiation beton emitted by a light source, particularly a laser, of the optical player. This radiation beam passes through the lens 107 and a tracking control system ensures that the scanning spot accurately follows the information track during scanning.

The section 105 of the scanning device has a focusing coil 113 surrounding the central body 114 and connected to the focus control system, which coil has turns disposed in planes parallel to the X-Y plane of the shown system of orthogonal axes. The section 105 also carries two pairs of tracking coils 115*a*, 115*b* and 117*a*, 117*b* connected to the tracking system. The tracking coils 115*a* and 115*b* are situated at one side of the central body 114 and extend along a line 119 parallel to the X axis, whereas the tracking coils 117*a* and 117*b* are situated at an opposite side and extend along a line 121 parallel to the line 119. The tracking coils 115*a*, 115*b* and 117*a*, 117*b*, which are secured to the focusing coil 113, have coil axes 123*a*, 123*b* and 125*a*, 125*b*, respectively, which in principle extend parallel to the Y axis.

A pair of magnet poles 127*a*, 127*b* and 129*a*, 129*b* is arranged opposite each pair of tracking coils 115*a*, 115*b* and 117*a*, 117*b*, respectively, to cooperate with the coils via an air gap 111. In the present example the magnet poles take the form of permanent magnets having magnetic axes oriented parallel to the Y axis and having polefaces of like polarity facing the tracking coils. The magnet poles 127a, 127b and 129a, 129b are situated within an area defined by two bounding planes 131 and 133 extending parallel to the X-Z plane of the shown system of axes. Each pair of magnet poles 127a, 127b and 129a, 129b has two facing surfaces 135a, 135b and 137a, 137b, respectively, bounding a zone 139, 141 which extends in the Y and Z directions. The tracking coils 115a, 115b and 117a, 117b are positioned in such a manner that at least in a center position, particularly viewed in the X direction, of the movable section 105 and, consequently, of the lens 107 the tracking coils are situated wholly within the area defined by the bounding planes 131 and 133. In FIG. 4 the lens is shown in this center position. The tracking coils 115a, 115b and 117a, 117b each extend opposite a magnet pole, one coil portion being disposed directly opposite a pole face. The tracking coils each also have a respective track portion 115a1, 115b1, 117a1 and 117b1 disposed in said zone 139, 141.

As a result of the magnet pole and tracking coil configurations used, where each pair of tracking coils 115a, 115b and 117a, 117b comprises two active coil portions disposed directly opposite the magnet poles 127a, 127b and 129a, 129b, respectively, and, interposed between these active coil portions, two coil portions disposed in magnetic stray fields of the magnet poles, the movable section 105 will be subjected to magnetic driving forces acting parallel to the X-axis when the tracking coils are energized, in order to move the section 105 carrying the lens 107 along a first axis, i.e. in a radial or tracking direction. By energizing the focusing coil 113 the movable section 105 and, as a consequence, the lens 107 can be moved in a focusing direction parallel to the Z axis for the purpose of focusing a radiation beam. In focus positions of the lens, in which the movable section has been moved relative to the center position along a second axis, torques are produced when the tracking coils are energized. However, surprisingly it has been found that these torques oppose one another in pairs and, inter alia as a result of the compact construction, are equal or substantially equal in magnitude, so that the torques substantially cancel one another at least substantially. As a result, the scanning device in accordance with the invention is not afflicted with annoying resonances of the movable section during tracking.

The originally flat annular tracking coils 115a, 115b and 117a, 117b may be bent, as is the case in the present example, so that said coil portions 115a1, 115b1, 117a1 and 117b1 are disposed opposite the surfaces 135a, 135b and 137a, 137b, respectively. This enables the stray fields of the magnet poles to be used efficiently for the purpose of generating extra strong driving forces when the tracking coils are energized.

Figure 3:
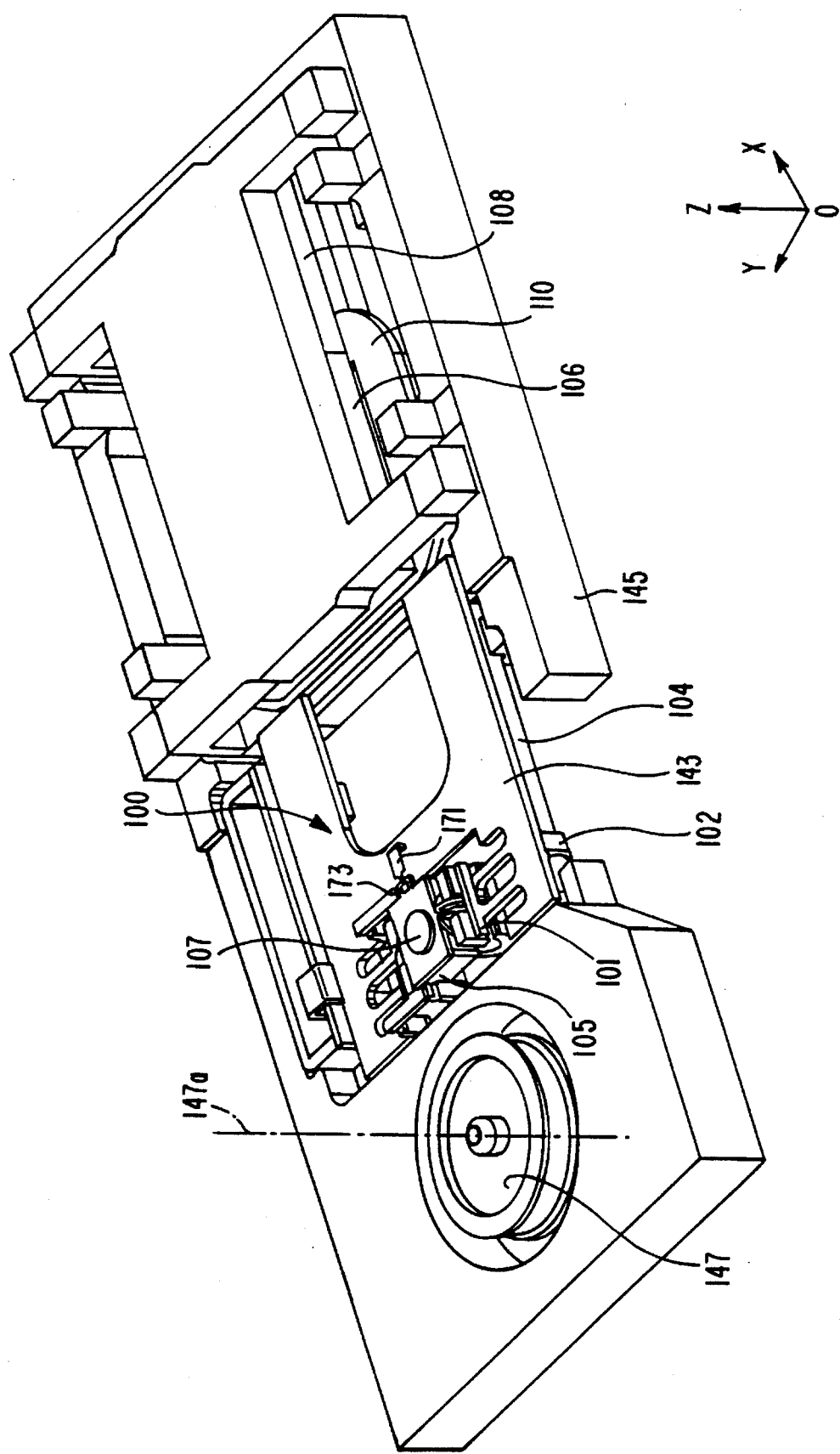
FIG. 3 shows a second embodiment of the apparatus in accordance with the invention.

In order to enable short access times to be achieved the scanning device shown in FIGS. 3 and 4 has mechanical limiting means for limiting radial movements of the movable section 105 relative to the section 101 along the X axis. The limiting means comprise a first limiting element 171 secured to the slide 143 and a second limiting element 173 secured to the section 105 of the scanning device. The second limiting element 173 has a recess 173a, in which a thickened end portion 171a of the first limiting element 171 is engageable with clearance. The first limiting element 171, which takes the form of a blade spring, is compliant viewed in a direction along the Z axis and is stiff viewed in a direction along the X axis. During rapid movements of the slide 143 the limiting element 173 may come into contact with the end portion 171a to limit the resulting radial excursion of the section 105. Thus, since the limiting element 171 is compliant, correct focusing movements of the lens 107 are also possible during rapid radial movements of the slide 143.

It is to be noted that the invention is not limited to the examples shown and described herein. Thus, the first limiting element and the second limiting element may, for example, be constructed as one integrated element.

I claim:

1. An apparatus for recording and/or reading information by means of a radiation beam, comprising:

a frame, a turntable for supporting a disc-shaped information carrier, means for rotating the turntable with respect to the frame, about an axis of rotation, a slide, means for moving the slide in an at least substantially radial direction relative to said axis of rotation, and a scanning device carried on the slide, comprising a first section secured to the slide, a second section which is movable relative to the first section and which includes an objective element defining an optical axis extending at least substantially parallel to said axis of rotation, and an actuator for moving the second section including the objective element in a first direction at least substantially parallel to said at least substantially radial direction and in a second direction along the optical axis for focusing, characterized in that the apparatus further comprises mechanical limit means for limiting movements of the second section with respect to the first section in said first direction, said mechanical limit means permitting movement of the second section in said second direction while said movements of the second section with respect to the first section in said first direction are being limited, wherein said limit means comprises a first limiting element connected to the first section, and a second limiting element connected to the second section and disposed to engage the first limiting element to limit relative movement, and both limiting elements are at least substantially stiff in the first direction and at least one of said limiting elements is compliant in the second direction.

2. An apparatus as claimed in claim 1, characterized in that said means for moving the slide produces accelerations of the slide which cause relative movement of the second section with respect to the first section in said first direction until the relative movement causes engagement of the limiting elements to limit further relative movement.

3. An apparatus as claimed in claim 1, characterized in that the first limiting element is compliant in the second direction.

4. An apparatus as claimed in claim 1, characterized in that the limiting elements engage in contact with each other only during limiting of relative movement.

5. An apparatus as claimed in claim 4, characterized in that the limiting element which is compliant in the second direction extends in the first direction and comprises an integral hinge having a hinge axis oriented transversely of the first direction and the second direction.

6. An apparatus as claimed in claim 1, characterized in that the first limiting element is compliant in the second direction, extends in the first direction, and comprises an integral hinge having a hinge axis oriented transversely of the first direction and the second direction.

7. An apparatus as claimed in claim 6, characterized in that the limiting elements engage in contact with each other only during limiting of relative movement.

8. A scanning device, comprising:

a first section, a second section which is movable relative to the first section and which includes an objective element defining an optical axis, and an actuator for moving the second section including the objective element in a first direction transverse to the optical axis, and in a second direction along the optical axis, characterized in that the apparatus further comprises mechanical limit means for limiting movements of the second section with respect to the first section in said first direction, said mechanical limit means permitting movement of the second section in said second direction while said movements of the second section with respect to the first section in said first direction are being limited, wherein said limit means comprises a first limiting element connected to the first section, and a second limiting element connected to the second section and disposed to engage the first limiting element to limit relative movement, and both limiting elements are at least substantially stiff in the first direction and at least one of said limiting elements is compliant in the second direction.

9. A device as claimed in claim 8, characterized in that the limiting elements engage in contact with each other only during limiting of relative movement.

* * * * *